US010666808B2

(12) United States Patent
Musik et al.

(10) Patent No.: US 10,666,808 B2
(45) Date of Patent: May 26, 2020

(54) METHOD AND SYSTEM FOR OPTIMIZING VOICE RECOGNITION AND INFORMATION SEARCHING BASED ON TALKGROUP ACTIVITIES (71) Applicant: MOTOROLA SOLUTIONS, INC., Chicago, IL (US)

(72) Inventors: Marta Tatiana Musik, Cracow (PL); Grzegorz Kaplita, Rzeszow (PL); Wojciech T. Wojcik, Cracow (PL)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 16/333,188

(22) PCT Filed: Sep. 21, 2016

(86) PCT No.: PCT/PL2016/050041
§ 371 (c)(1),
(2) Date: Mar. 13, 2019

(87) PCT Pub. No.: WO2018/056846
PCT Pub. Date: Mar. 29, 2018

(65) Prior Publication Data
US 2019/0222698 A1  Jul. 18, 2019

(51) Int. Cl.
*H04M 3/56* (2006.01)
*H04W 4/10* (2009.01)
(Continued)

(52) U.S. Cl.
CPC ............ *H04M 3/56* (2013.01); *G06F 16/638* (2019.01); *G06F 16/686* (2019.01); *G10L 15/08* (2013.01);
(Continued)

(58) Field of Classification Search
CPC ..... G06F 16/638; G06F 16/686; G10L 15/08; G10L 15/22; G10L 15/26;
(Continued)

(56) References Cited

U.S. PATENT DOCUMENTS 6,477,387 B1 * 11/2002 Jackson ............... H04W 84/08
455/508
6,829,942 B2  12/2004 Yanai et al.
(Continued)

FOREIGN PATENT DOCUMENTS

EP       1659756      5/2006
WO      2011151502   12/2011
WO      2015030796    3/2015

OTHER PUBLICATIONS

Australian 1st Examination Report dated Sep. 24, 2019 for corresponding Australian Application No. 2016423667 (4 pages).
(Continued)

*Primary Examiner* — Tan H Trinh
(74) *Attorney, Agent, or Firm* — Michael Best & Friedrich LLP (57) ABSTRACT A method and system for optimizing voice recognition and information searching. The method includes determining context data associated with a particular talkgroup (140) that includes a plurality of communications devices (120) and creating a list of talkgroup-specific keywords associated with the context data, the list of talkgroup-specific keywords including a first characteristic for each talkgroup-specific keyword. The method also includes receiving, from a first communications device (120A) of the plurality of communications devices (120), audio data associated with a user of the first communications device (120A) and processing the audio data to generate an initial output term. The method further includes determining a second characteristic of the initial output term and determining whether the first char-
(Continued)

acteristic of a talkgroup-specific keyword from the list of talkgroup-specific keywords matches the second characteristic of the initial output term. The method also includes outputting the keyword when the first characteristic matches the second characteristic.

14 Claims, 4 Drawing Sheets

(51) Int. Cl.
| | |
|---|---|
| *G10L 15/08* | (2006.01) |
| *G06F 16/68* | (2019.01) |
| *G06F 16/638* | (2019.01) |
| *G10L 15/22* | (2006.01) |
| *G10L 15/26* | (2006.01) |

(52) U.S. Cl.
CPC .............. *G10L 15/22* (2013.01); *H04W 4/10* (2013.01); *G10L 15/26* (2013.01); *G10L 2015/088* (2013.01); *G10L 2015/226* (2013.01); *H04M 2201/40* (2013.01); *H04M 2203/2044* (2013.01)

(58) Field of Classification Search
CPC ........ G10L 2015/088; G10L 2015/226; H04M 2201/40; H04M 2203/2044; H04M 3/56; H04W 4/10
USPC ................ 455/518, 519, 509, 458; 370/316; 704/244, 231
See application file for complete search history.

(56) References Cited

U.S. PATENT DOCUMENTS

| | | | |
|---|---|---|---|
| 7,844,460 B2 | 11/2010 | Charlier et al. | |
| 8,370,155 B2 | 2/2013 | Byrd et al. | |
| 8,775,416 B2 | 7/2014 | Heck | |
| 8,799,188 B2 | 8/2014 | Biran et al. | |
| 8,837,906 B2 | 9/2014 | May et al. | |
| 2003/0153343 A1* | 8/2003 | Crockett | H04W 76/45 455/519 |
| 2005/0227722 A1* | 10/2005 | Harris | H04W 76/45 455/518 |
| 2006/0074671 A1* | 4/2006 | Farmaner | G10L 15/193 704/257 |
| 2008/0005076 A1 | 1/2008 | Payne et al. | |
| 2009/0055179 A1* | 2/2009 | Cho | G10L 15/193 704/246 |
| 2009/0259629 A1 | 10/2009 | Wei et al. | |
| 2010/0074446 A1 | 3/2010 | Fuchs et al. | |
| 2011/0152708 A1 | 6/2011 | Adachi et al. | |
| 2012/0244812 A1 | 9/2012 | Rosener | |
| 2013/0159404 A1* | 6/2013 | Pfaff | G06F 3/0482 709/204 |
| 2014/0082545 A1 | 3/2014 | Zhai et al. | |
| 2014/0108370 A1* | 4/2014 | Andri | G06Q 30/0267 707/706 |
| 2014/0168130 A1* | 6/2014 | Hirai | G10L 15/00 345/173 |
| 2014/0294161 A1 | 10/2014 | O'Conor et al. | |
| 2014/0324428 A1* | 10/2014 | Farraro | G10L 15/22 704/244 |
| 2015/0045003 A1* | 2/2015 | Vora | H04M 1/64 455/412.2 |
| 2015/0063202 A1* | 3/2015 | Mazzarella | H04W 4/90 370/316 |
| 2015/0065186 A1* | 3/2015 | Mohd Mohdi | H04W 4/10 455/518 |
| 2015/0072716 A1 | 3/2015 | Klein | |
| 2015/0161989 A1* | 6/2015 | Hsu | G10L 15/08 704/251 |
| 2016/0253603 A1* | 9/2016 | Washizu | G06Q 10/025 705/6 |
| 2016/0306798 A1 | 10/2016 | Guo | |
| 2016/0372139 A1* | 12/2016 | Cho | H04N 21/434 |
| 2017/0027514 A1 | 2/2017 | Biederman et al. | |
| 2019/0005978 A1* | 1/2019 | Barnett | G10L 21/10 |
| 2019/0082305 A1* | 3/2019 | Proctor | H04W 4/10 |
| 2019/0259382 A1* | 8/2019 | Stogner | G10L 15/22 |
| 2019/0318035 A1* | 10/2019 | Blanco | G10L 15/22 |

OTHER PUBLICATIONS

Hearst Magazine, "How to stop Apple and Google tracking your every move using your smartphone GPS," Jul. 24, 2015, XP055311661,Retrieved from the Internet: URL:http://www.digitalspy.com/tech/android/feature/a660030/how-to-stop-apple-and-google-tracking-your-every-move-using-your-smartphone-gps/ [retrieved on Oct. 18, 2016] p. 1-4.

Lewis et al., "A Reference Architecture for Group-Context-Aware Mobile Applications," specification (2013) pp. 44-63, CMU Software Engineering Institute, https://resources.sei.cmu.edu/asset_files/ConferencePaper/2012_021_001_435804.pdf.

Siri—Wikikpedia the Free Encylopedia, "How to stop Apple and Google tracking your every move using your smartphone GPS," Sep. 2015, XP055311606,Retrieved from the Internet: URL:https://en.wikipedia.org/w/index.php?title=Siri&oldid=682044481[retrieved on Oct. 18, 2016] p. 1-10.

Office Action from the US Patent and Trademark Office for U.S. Appl. No. 14/862,759 dated May 18, 2018 (16 pages).

Office Action from the US Patent and Trademark Office for U.S. Appl. No. 14/862,759 dated Oct. 18, 2017 (18 pages).

Office Action from the US Patent and Trademark Office for U.S. Appl. No. 14/863,072 dated Aug. 9, 2018 (48 pages).

PCT/US2016/048029 International Search Research Report and Written Opinion dated Oct. 25, 2016 (10 pages).

PCT/PL2016/050041 International Search Report and Written Opinion of the International Searching Authority dated May 12, 2017 (13 pages).

Office Action from the US Patent and Trademark Office for U.S. Appl. No. 14/863,072 dated Jan. 18, 2019 (36 pages).

Australian Examination Report No. 2 for dated Jan. 10, 2020 corresponding Australian Patent Application No. 2016423667 (3 pages).

Canadian Office Action dated Feb. 3, 2020 for corresponding Canadian Application No. 3,036,778 (3 pages).

U.S. Office Action dated Jan. 17, 2020 for co-pending U.S. Appl. No. 14/863,072 (45 pages).

\* cited by examiner

METHOD AND SYSTEM FOR OPTIMIZING VOICE RECOGNITION AND INFORMATION SEARCHING BASED ON TALKGROUP ACTIVITIES

BACKGROUND OF THE INVENTION

In search-engines, recommendation systems, and voice interfaces to applications, search results and voice recognition are optimized based on a single user's search history and previous patterns. However, natural language is complicated and the same word or sentence may mean different things depending on the user interests, context, situation, and the like. As a result, many existing methods of voice recognition and searching are inaccurate.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In public safety organizations, first responders often deal with noisy environments. Existing processing techniques may not be able to recognize speech accurately in these noisy environments. Public safety communication systems are often organized in groups (for example, talkgroups). In many instances groups of public safety personnel are dispatched for the same mission or interested in similar items. It is also likely that they will use the same names and terms in their communications.

One embodiment provides a method of operating a call controller for improving voice recognition and information searching within a talkgroup. The method includes determining context data associated with a particular talkgroup that includes a plurality of communications devices and creating a list of talkgroup-specific keywords associated with the context data, the list of talkgroup-specific keywords including a first characteristic for each talkgroup-specific keyword. The method also includes receiving from a first communications device of the plurality of communications devices, audio data associated with a user of the first communications device and processing the audio data to generate an initial output term. The method further includes determining a second characteristic of the initial output term and determining whether the first characteristic of a talkgroup-specific keyword from the list of talkgroup-specific keywords matches the second characteristic of the initial output term. The method also includes outputting the talkgroup-specific keyword when the first characteristic matches the second characteristic.

Another embodiment provides a system for optimizing voice recognition and information searching. The system includes a plurality of communications devices forming a talkgroup. The system also includes a call controller communicating with the plurality of communications devices forming the talkgroup and including an electronic processor. The electronic processor is configured to determine context data associated with the talkgroup that includes the plurality of communications devices and create a list of talkgroup-specific keywords associated with the context data, the list of talkgroup-specific keywords including a first characteristic for each talkgroup-specific keyword. The electronic processor is also configured to receive, from a first communications device of the plurality of communications devices, audio data associated with a user of the first communications device and process the audio data to generate an initial output term; The electronic processor is further configured to determine a second characteristic of the initial output term and determine whether the first characteristic of a talkgroup-specific keyword from the list of talkgroup-specific keywords matches the second characteristic of the initial output term. The electronic processor then outputs the talkgroup-specific keyword when the first characteristic matches the second characteristic.

Figure 1:
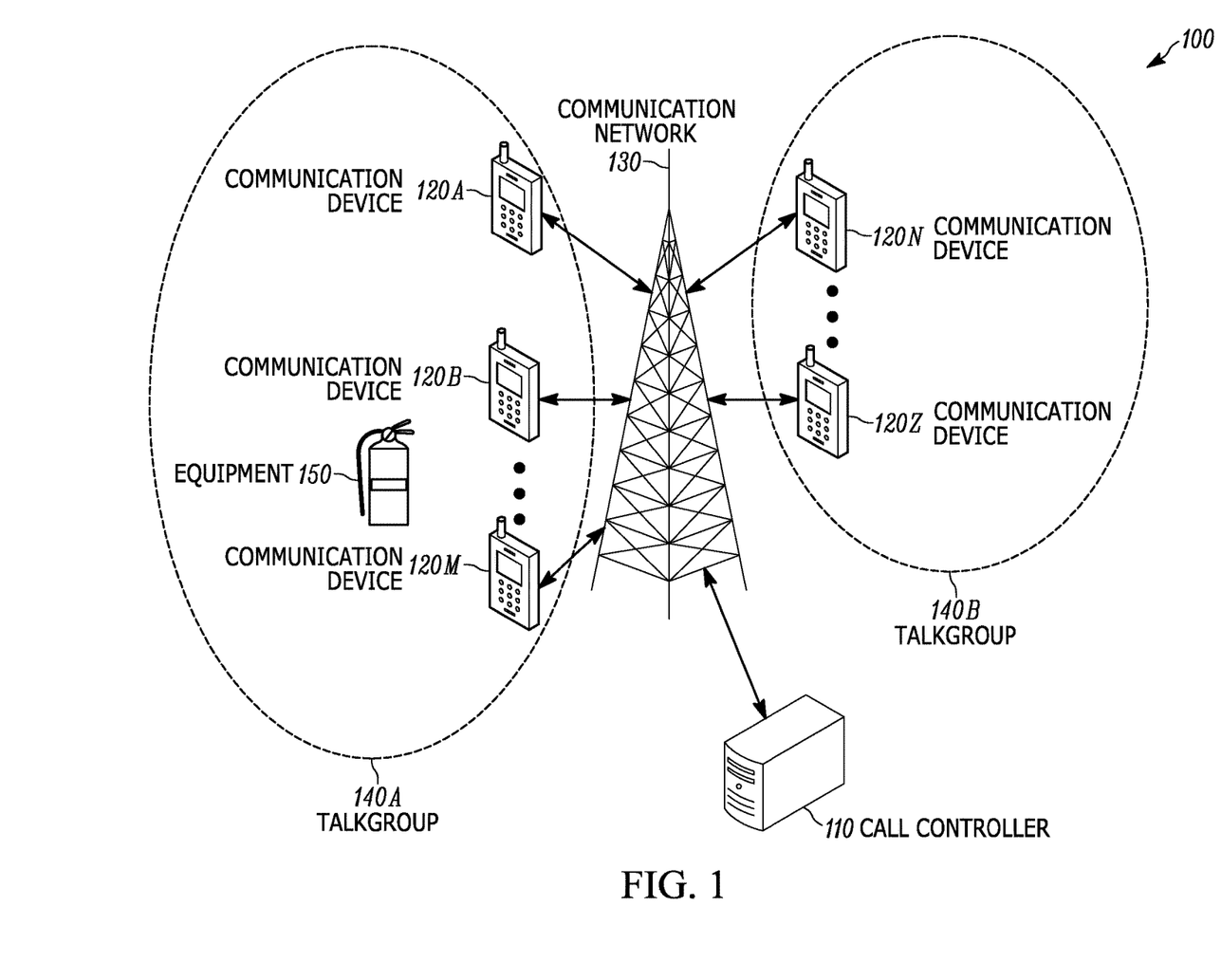
FIG. 1 is a diagram of a system for optimizing voice recognition and information searching in accordance with some embodiments.

FIG. 1 is a diagram of one embodiment of a system 100 for improving voice recognition and information searching. In the example illustrated, the system 100 includes a call controller 110. The call controller 110 may be, for example, a dispatch controller for a public safety organization. The call controller 110 communicates with a plurality of communications devices 120A through 120Z via a communication network 130. On a singular basis, one of the communications devices 120A through 120Z may be referred to herein as a communications device 120. The communications devices 120A through 120Z may be, for example, a mobile two-way radio, a smart telephone, a smart watch, a laptop computer, a tablet computer, or other similar devices.

The communication network 130 may be a wired or wireless communication network, such as a cellular network, a land mobile radio (LMR) network, or the like. Portions of the communication network 130 may be implemented using various wide area networks, for example the Internet, and local area networks, for example, a Bluetooth™ network, a wireless local area network (for example, Wi-Fi), as well as future developed networks, or a combination thereof.

Each communications device 120 may belong to one or more talkgroups 140 that a user of the communications device 120 may switch between. A talkgroup 140 is a virtual radio channel on a digital radio system. Each communications device 120 in a particular talkgroup 140 is assigned a talkgroup identifier, which allows the communications device 120 to communicate with other communications devices 120 assigned the same talkgroup identifier. In the example illustrated, communications devices 120A through 120M belong to talkgroup 140A and communications devices 120N through 120Z belong to talkgroup 140B. For example, communications devices 120A through 120M that may be participating in a hazardous materials operation belong to the talkgroup 140A. At the beginning of the hazardous materials operation, the communications devices 120A through 120M are provided with a talkgroup identifier for the talkgroup 140A. During the hazardous materials operation, the talkgroup 140A allows users of the communications devices 120A through 120M to send communications to each other and the call controller 110 via the communication network 130. Communications devices 120 (and thus the users of the communications devices 120) can be assigned to multiple talkgroups 140. As used in this description, talkgroup 140 may include a traditional static or dynamic talkgroup, an incident area network including multiple talkgroups, a geofence, equipment used by members of a personal area network, and the like. In some embodiments, equipment 150 may also be associated with a talkgroup 140. Equipment 150 may include, for example, a smart HAZMAT suit, body-mounted camera, guns, fire extinguishers, and the like. As an example, a smart HAZMAT suit may be associated with the talkgroup 140A when the communications devices 120A through 120M are participating in a hazardous materials operation.

FIG. 1 illustrates only one exemplary embodiment of a system 100. In other embodiments, the system 100 may include more or fewer components and may perform functions that are not explicitly described herein. In addition, although the call controller 110 is illustrated as communicating with all communications devices 120A through 120Z via a single communication network 130, the call controller 110 may communicate with the communications devices 120A through 120Z via multiple communication networks (constructed in accordance with various network protocols) and connections (for example, wired or wireless connections). Further, although the system 100 is shown as a centralized system, the system 100 may also be implemented as a decentralized system in which the functionality of the call controller 110 is accomplished within one or more of the communications devices 120.

Figure 2:
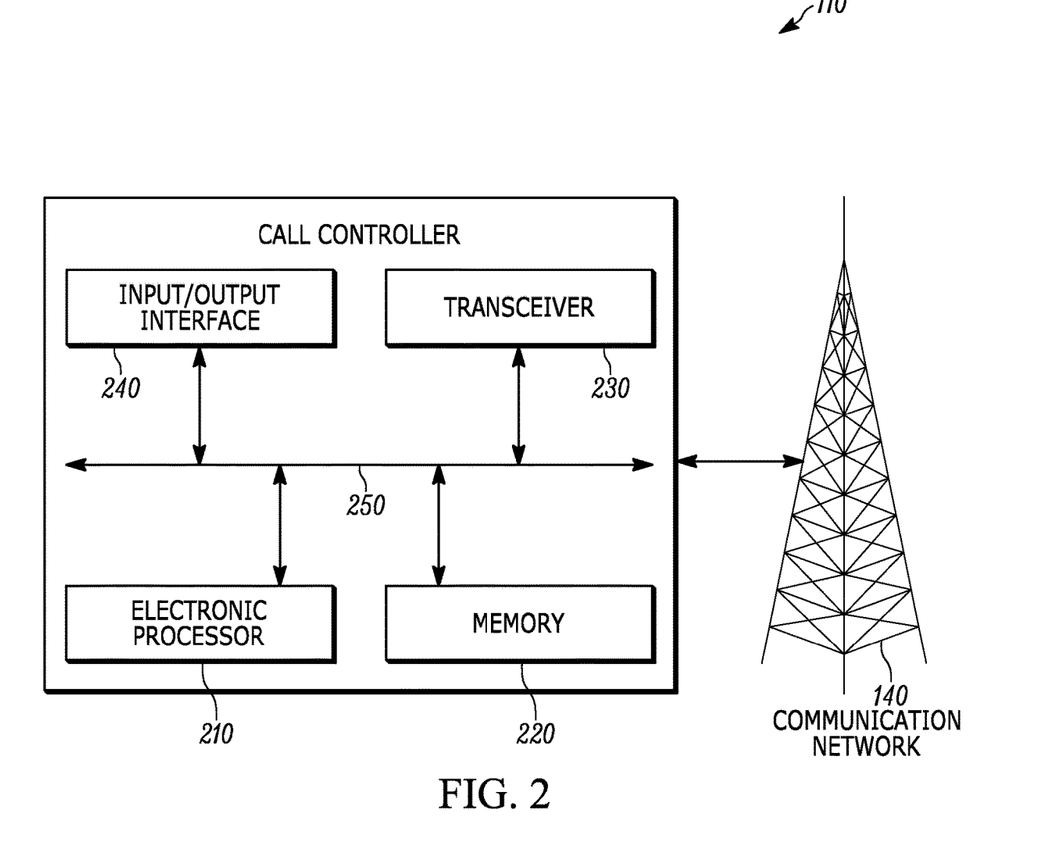
FIG. 2 is a diagram of a call controller in accordance with some embodiments.

FIG. 2 is a diagram of one embodiment of the call controller 110. In the example illustrated, the call controller 110 includes an electronic processor 210, a memory 220, a transceiver 230, and an input/output interface 240. The electronic processor 210, the memory 220, the transceiver 230, and the input/output interface 240 communicate over one or more control and/or data buses (for example, a communication bus 250). FIG. 2 illustrates only one exemplary embodiment of a call controller 110. The call controller 110 may include more or fewer components and may perform functions other than those explicitly described herein.

In some embodiments, the electronic processor 210 is implemented as a microprocessor with separate memory, such as the memory 220. In other embodiments, the electronic processor 210 may be implemented as a microcontroller (with memory 220 on the same chip). In other embodiments, the electronic processor 210 may be implemented using multiple processors. In addition, the electronic processor 210 may be implemented partially or entirely as, for example, a field-programmable gate array (FPGA), and application specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out functionality of the call controller 110 described herein. The memory 220 may include, for example, a program storage area and a data storage area. The program storage area and the data storage area may include combinations of different types of memory, such as read-only memory and random-access memory.

The transceiver 230 enables wireless communication from the call controller 110 to, for example, the communications devices 120A through 120Z via the communication network 130. In other embodiments, rather than the transceiver 230, the call controller 110 may include separate transmitting and receiving components, for example, a transmitter, and a receiver. In yet other embodiments, the call controller 110 may not include a transceiver 230 and may communicate with the communications devices 120A through 120Z via a network interface and a wired connection to the communication network 130.

As noted above, the call controller 110 may include the input/output interface 240. The input/output interface 240 may include one or more input mechanisms (for example, a touch screen, a keypad, a button, a knob, and the like), one or more output mechanisms (for example, a display, a printer, a speaker, and the like), or a combination thereof. The input/output interface 240 receives input from input devices actuated by a user, and provides output to output devices with which a user interacts. In some embodiments, as an alternative or in addition to managing inputs and outputs through the input/output interface 240, the call controller 110 may receive user input, provide user output, or both by communicating with an external device, such as a console computer, over a wired or wireless connection.

Figure 3:
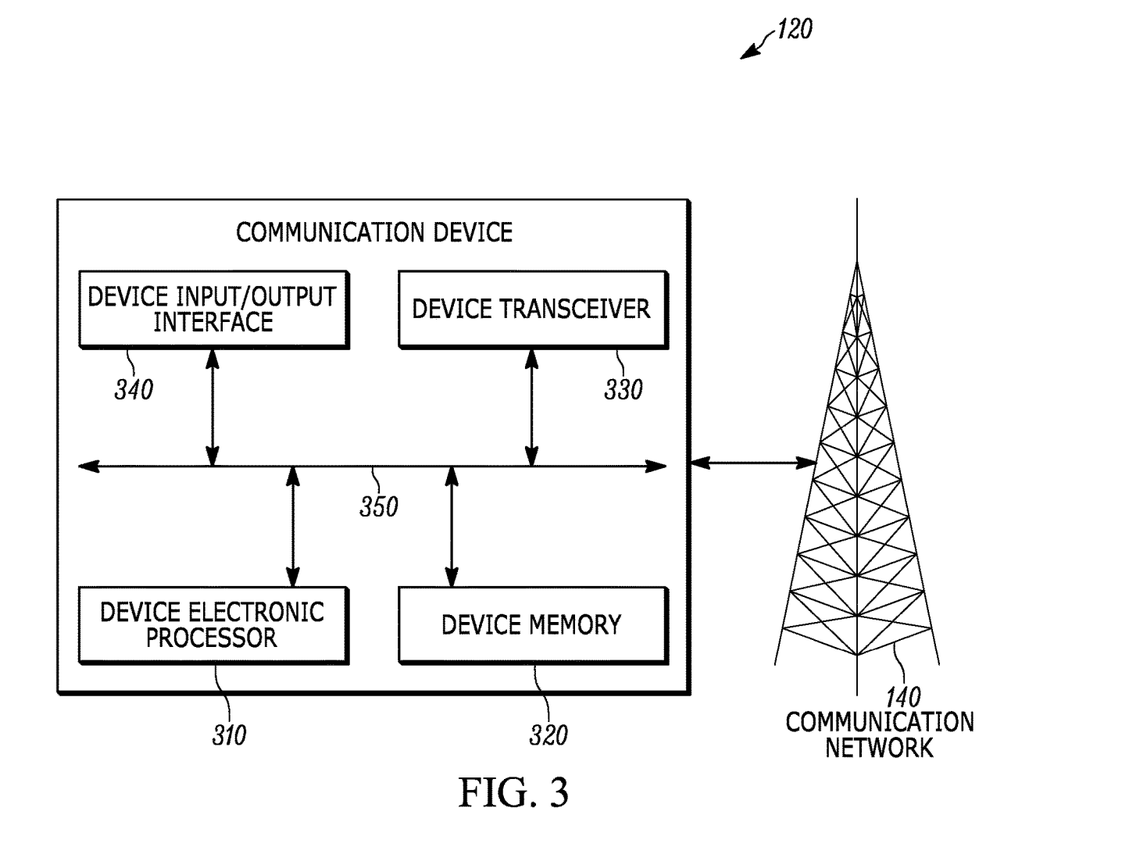
FIG. 3 is a diagram of a communications device in accordance with some embodiments.

FIG. 3 is a diagram of one embodiment of a communications device 120. In the example illustrated, the communications device 120 includes, among other things, a device electronic processor 310, a device memory 320, a device transceiver 330, and a device input/output interface 340. The device electronic processor 310, the device memory 320, the device transceiver 330, and the device input/output interface 340 communicate over one or more control and/or data buses (for example, a device communication bus 350). FIG. 3 illustrates only one exemplary embodiment of the communications device 120. The communications device 120 may include more or fewer components than illustrated and may perform additional functions other than those described herein.

The device electronic processor 310 may be implemented in various ways including ways that are similar to those described above with respect to the electronic processor 210. Likewise, the device memory 320 may be implemented in various ways including ways that are similar to those described with the respect to the memory 220. The device memory 320 may store instructions that are received and executed by the device electronic processor 310 to carry out the functionality described herein.

The device transceiver 330 enables wireless communication from the communications device 120 to, for example, the call controller 110 via the communication network 130. In other embodiments, rather than a device transceiver 330, the communications device 120 may include separate transmitting and receiving components, for example, a transmitter and a receiver.

The device input/output interface 340 may include one or more input mechanisms (for example, a touch screen, a keypad, a button, a knob, and the like), one or more output mechanisms (for example, a display, a speaker, and the like), or a combination thereof. In some embodiments, the communications device 120 communicates with one or more external devices that may be part of a personal area network (PAN) of devices. The one or more external devices may include, for example, a holster sensor, a gas sensor, one or more garment sensors or components such as those in a smart hazardous materials (HAZMAT) suit, a body-mountable camera, and the like.

Figure 4:
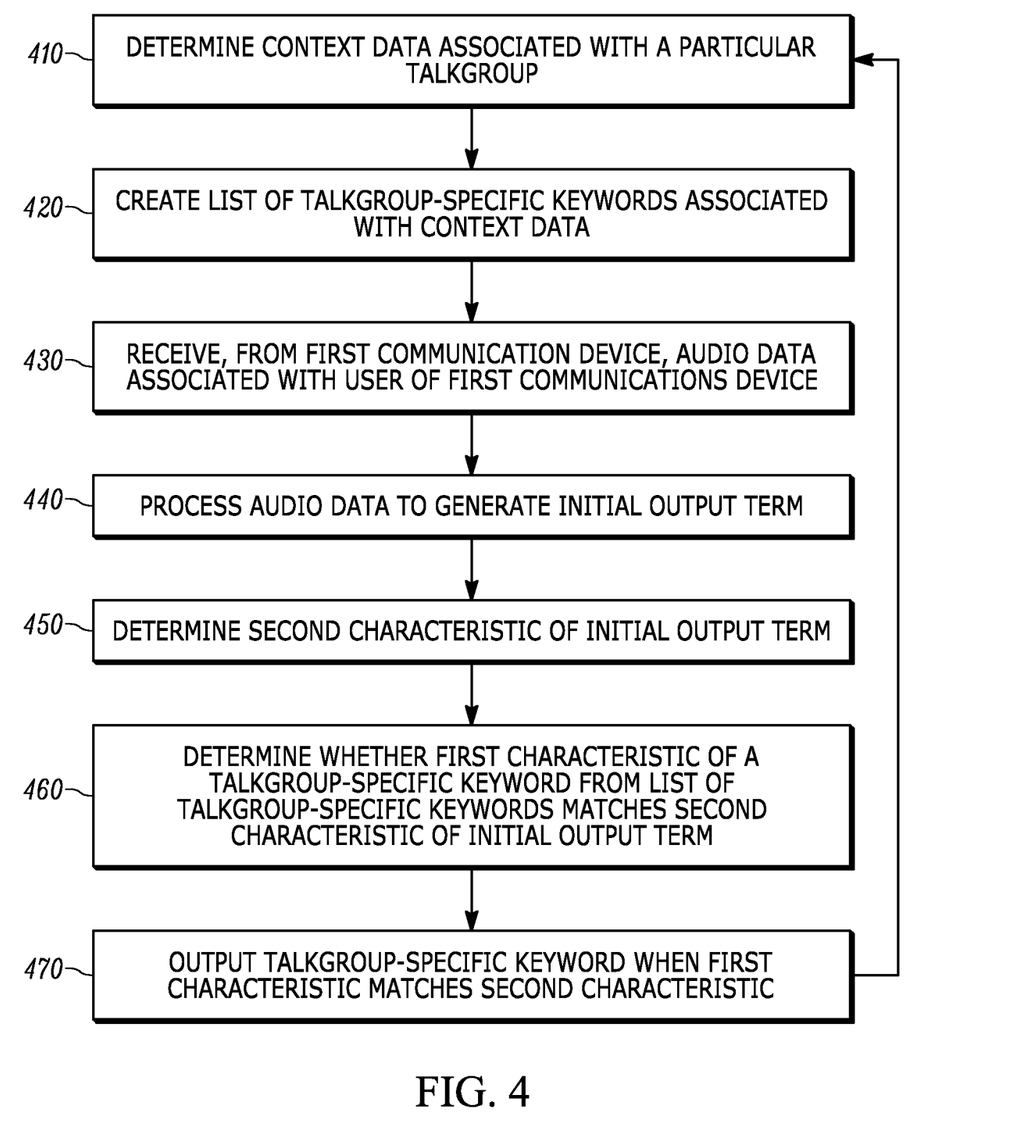
FIG. 4 is a diagram of a method for improving voice recognition and information searching in accordance with some embodiments Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

FIG. 4 is a flowchart illustrating one example method 400 for improving voice recognition and information searching. As illustrated in FIG. 4, the method 400 includes the call controller 110 determining, using the electronic processor 210, context data associated with a particular talkgroup 140 that includes a plurality of communications devices 120 (at block 410). In some embodiments, context data includes keywords extracted from voice communication within the talkgroup 140. The call controller 110 may record all voice communication taking place in the talkgroup 140 and store it in the memory 220. The call controller 110 may then process the stored voice communications (for example, prior voice communication) using known speech recognition techniques to convert voice communication into text that may then be stored in the memory 220. In some embodiments, the call controller 110 automatically processes the voice communication without storing the voice communication in the memory 220. The call controller 110 may store some or all text extracted from the voice communication. In some embodiments, the text includes certain keywords unique to the operation or mission being executed by the users of the communications devices 120. For example, in suspect pursuit operations, extracted text can include license plate numbers, landmarks, street names, and the like. In these embodiments, the call controller 110 may store only the keywords unique to the operation or mission. Alternatively, the call controller 110 may store all the keywords but, provide a higher rank to the keywords unique to the operation or mission.

In some embodiments, context data may include status updates, for example, from a computer-aided-dispatch system. The call controller 110 may include a computer-aided dispatcher that maintains status of the communications devices 120 associated with a talkgroup 140, status of users of the communications devices 120 associated with a talkgroup 140, status or information of the mission the users are executing, and the like. Based on the information received from the communications devices 120, the computer-aided dispatcher may update the status of the mission. For example, during a fire incident, a user may communicate the discovery of a dangerous chemical in the vicinity of the fire. The computer-aided dispatcher may then update the status of the mission to include a hazardous materials operation.

In some embodiments, context data may include usage and presence of equipment 150 in a personal area network of a communications device 120 associated with a particular talkgroup 140. The communications devices 120 detect the presence or usage of equipment 150 such as, a hazardous materials suit, a weapon, or the like. The communications devices 120 then transmit the usage and presence information to the call controller 110. In some embodiments, context data may also include data from sensors. The communications devices 120 receive sensor data from sensors within a personal area network of the communications device 120. For example, a first communications device 120A may receive sensor data from, for example, a holster sensor, a temperature sensor, a blood pressure sensor, or the like worn by a public safety officer (for example, a talkgroup participant). The first communications device 120A then transmits the sensor information to the call controller 110. In some embodiments, context data may include a global positioning system (GPS) location of the communications device 120 (for example, one or more locations of the communications devices 120) transmitted from the communications devices 120 to the call controller 110. In some embodiments, users of the communications devices 120 may have equipment 150 that cannot be paired with the personal area network of the communications devices 120. In these embodiments, the call controller 110 may still receive context data that includes usage and presence of equipment 150. For example, the call controller 110 may detect (by referring to a look-up table) that a particular equipment 150 is present or is being used based on the mission being carried out by the talkgroup 140 or based on the type of public safety personnel assigned to the talkgroup 140. In another example, the call controller 110 may receive the equipment 150 being used through a user input.

The method 400 also includes the call controller 110 creating, using the electronic processor 210, a list of talkgroup-specific keywords associated with the context data (at block 420). Context data associated with the particular talkgroup 140 is merged together to create the list of talkgroup-specific keywords. As described above, the call controller 110 determines context data based on communications received from a plurality of communications devices 120, sensor data received from the plurality of communication devices, information about the roles and responsibilities of the members of the talkgroup 140, presence and usage of equipment 150 by the members of the talkgroup 140, and the like. The call controller 110 logs this data and builds a database of talkgroup-specific keywords by merging these multiple inputs. In some embodiments, the call controller 110 may store a look-up table in the memory 220 including a correlation between context data and certain keywords. For example, the look-up table may include certain chemical names for a smart HAZMAT suit. When the call controller 110 determines that the context data includes a smart HAZMAT suit, the call controller 110 refers the look-up table to extract the chemical names related to the smart HAZMAT suit. In some embodiments, the database also includes characteristics (for example, a first characteristic) of the talkgroup-specific keywords. The characteristics include, for example, a length of the talkgroup-specific keyword, an initial sound of the talkgroup-specific keyword, and the like. The characteristics of the talkgroup-specific keywords may be determined using, for example, known speech-to-text or text-to-speech techniques. In some embodiments, the call controller 110 may rank the talkgroup-specific keywords based on relevance to a mission being executed by the users of the communications devices 120. For example, during a fire incident, a chemical name may be ranked higher than a license plate number. The call controller 110 may constantly update the database as it receives new information and context data from the communications devices 120 within the talkgroup 140.

The method 400 includes receiving, at the electronic processor 210 from a first communications device 120A, audio data associated with a user of the first communications device 120A (at block 430). The audio data corresponds to a verbal input received at a communications device 120. The audio data (or a verbal input) may be a voice command or a query being requested by the user of the first communications device 120A. The query may be in form of a voice query or a search term. The first communications device 120A upon receiving audio data transmits the audio data to the call controller 110 via the communication network 130. Public safety officers often work in noisy environments. The noise may drown out the audio data such that one or more words in the audio data cannot be initially recognized. In some embodiments, the user of the first communications device 120A may type in a command or query. In these embodiments, the command or query may include misspelled or incomplete words.

The method 400 includes processing, using the electronic processor 210, the audio data to generate an initial output term (at block 440). The call controller 110 may use existing native language processing techniques to generate an initial output term. In some embodiments, the initial output term may be a best guess for the unrecognized audio data generated by the call controller 110. In some embodiments, the call controller 110 may generate more than one initial output terms (for example, a second list of keywords). The generated initial output terms may be ranked based on the probability of the unrecognized term matching the generated initial output terms. That is, the second list of keywords are ranked by probability based on natural language processing of the audio data.

The method 400 includes determining, using the electronic processor 210, a second characteristic of the initial output term (and thereby the audio data) (at block 450). As described above, the second characteristic may include, for example, a length of the initial output term, an initial sound of the initial output term, and the like. In some embodiments, the initial output term may be a partial term enough to determine a second characteristic of the audio data. The method 400 includes determining, using the electronic processor 210, whether the first characteristic of a talkgroup-specific keyword from the list of talkgroup-specific keywords matches the second characteristic of the initial output term (at block 460). The call controller 110 compares the second characteristic of the initial output term to the list of talkgroup-specific keywords. The call controller 110 then determines whether there is a talkgroup-specific keyword whose first characteristic matches the second characteristic of the initial output term. The method 400 includes outputting, using the electronic processor 210, the talkgroup-specific keyword when the first characteristic matches the second characteristic (at block 470). The call controller 110 then recognizes the audio data and performs the function requested by the verbal input. For example, the call controller 110 may recognize that the audio data is a command to adjust settings of a particular equipment 150. The call controller 110 automatically adjusts the settings of the equipment 150 upon recognizing the audio data. In some embodiments, when there is no talkgroup-specific keyword whose first characteristic matches the second characteristic of the initial output term, the call controller 110 may output the initial output term or an error message.

The method 400 repeats to continuously receive additional context data (for example, second context data) and updates the list of talkgroup-specific keywords based on the determined context data. This way the call controller 110 continuously optimizes voice recognition and information searching based on talkgroup-activity. In some embodiments, more than one talkgroup-specific keyword may include a first characteristic that matches the second characteristic. The call controller 110 may rank the talkgroup-specific keywords that relate to activity logs or context data determined from the talkgroup 140 higher than those talkgroup-specific keywords that do not. In some embodiments, the talkgroup-specific keywords that relate to more activity logs or context data may get a higher rank than those that relate to fewer. In other embodiments, the talkgroup-specific keywords that relate to recent activity logs or context data may get a higher rank (for example, based on a type of context data) than those that relate to older activity logs or context data. The call controller 110 may then output the talkgroup-specific keyword (for example, a second talkgroup-specific keyword) with the highest rank. Alternatively, the call controller 110 may output all the matched talkgroup-specific keywords in the order or their rankings.

One advantage of the above techniques is that voice recognition and information searching can be improved and optimized to recognize relevant talkgroup-specific keywords based on context data determined based on relevant activities and history or a particular talkgroup rather than from a single user.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operating a call controller including an electronic processor for improving voice recognition and information searching within a talkgroup, the method comprising:
   determining, using the electronic processor, context data associated with the talkgroup that includes a plurality of communications devices;
   creating, using the electronic processor, a list of talkgroup-specific keywords associated with the context data, the list of talkgroup-specific keywords including a first characteristic for each talkgroup-specific keyword;
   assigning a rank to each talkgroup-specific keyword in the list of talkgroup-specific keywords based on a type of context data, from which each talkgroup-specific keyword in the list of talkgroup-specific keywords is extracted;
   receiving, at the electronic processor from a first communications device of the plurality of communications devices, audio data associated with a user of the first communications device;
   processing, using the electronic processor, the audio data to generate an initial output term;
   determining, using the electronic processor, a second characteristic of the initial output term;
   determining, using the electronic processor, that a first characteristic of a talkgroup-specific keyword from the list of talkgroup-specific keywords matches the second characteristic of the initial output term;
   determining, using the electronic processor, that the first characteristic of a second talkgroup-specific keyword from the list of talkgroup-specific keywords matches the second characteristic of the initial output term, the second talkgroup-specific keyword having a higher rank than the talkgroup-specific keyword; and
   outputting, using the electronic processor, the second talkgroup-specific keyword.

2. The method of claim 1, wherein the context data associated with the talkgroup includes at least one selected from a group consisting of prior voice communication in the particular talkgroup, prior status updates from a computer-aided dispatcher, presence of equipment in a personal area network of a talkgroup participant, usage of equipment, data from sensors of a talkgroup participant, and one or more locations of the plurality of communications devices.

3. The method of claim 1, further comprising:
   determining, using the electronic processor, second context data associated with the talkgroup; and
   adjusting the rank for each talkgroup-specific keyword in the list of talkgroup-specific keywords based on the context data and the second context data.

4. The method of claim 1, wherein the audio data includes one selected from a group consisting of a voice command and a search term.

5. A method of operating a call controller including an electronic processor for improving voice recognition and information searching within a talkgroup, the method comprising:
   determining, using the electronic processor, context data associated with the talkgroup that includes a plurality of communications devices;
   creating, using the electronic processor, a list of talkgroup-specific keywords associated with the context data, the list of talkgroup-specific keywords including a first characteristic for each talkgroup-specific keyword;
   receiving, at the electronic processor from a first communications device of the plurality of communications devices, audio data associated with a user of the first communications device;
   processing, using the electronic processor, the audio data to generate an initial output term;
   determining, using the electronic processor, a second characteristic of the initial output term, wherein determining the second characteristic of the initial output term includes determining, using the electronic processor, a second list of keywords ranked by probability based on natural language processing of the audio data;
   determining whether the list of talkgroup-specific keywords includes at least one keyword from the second list of keywords; and
   outputting, using the electronic processor, the at least one keyword from the second list of keywords when the list of talkgroup-specific keywords includes the at least one keyword from the second list of keywords.

6. The method of claim 5, wherein the context data associated with the talkgroup includes at least one selected from a group consisting of prior voice communication in the particular talkgroup, prior status updates from a computer-aided dispatcher, presence of equipment in a personal area network of a talkgroup participant, usage of equipment, data from sensors of a talkgroup participant, and one or more locations of the plurality of communications devices.

7. The method of claim 5, wherein the audio data includes one selected from a group consisting of a voice command and a search term.

8. A system for optimizing voice recognition and information searching, comprising:
    a plurality of communications devices forming a talkgroup; and
    a call controller communicating with the plurality of communications devices forming the talkgroup and including an electronic processor, the electronic processor configured to:
        determine context data associated with the talkgroup that includes the plurality of communications devices;
        create a list of talkgroup-specific keywords associated with the context data, the list of talkgroup-specific keywords including a first characteristic for each talkgroup-specific keyword;
        assign a rank to each talkgroup-specific keyword in the list of talkgroup-specific keywords based on a type of context data, from which each talkgroup-specific keyword in the list of talkgroup-specific keywords is extracted;
        receive, from a first communications device of the plurality of communications devices, audio data associated with a user of the first communications device;
        process the audio data to generate an initial output term;
        determine a second characteristic of the initial output term;
        determine that a first characteristic of a talkgroup-specific keyword from the list of talkgroup-specific keywords matches the second characteristic of the initial output term;
        determine that the first characteristic of a second talkgroup-specific keyword from the list of talkgroup-specific keywords matches the second characteristic of the initial output term, the second talkgroup-specific keyword having a higher rank than the talkgroup-specific keyword; and
        output the second talkgroup-specific keyword.

9. The system of claim 8, wherein the context data associated with the talkgroup includes at least one selected from a group consisting of prior voice communication in the talkgroup, prior status updates from a computer-aided dispatcher, presence of equipment in a personal area network of a talkgroup participant, data from sensors of a talkgroup participant, and one or more locations of the plurality of communications devices.

10. The system of claim 8, wherein the electronic processor is further configured to:
    determine second context data from the talkgroup; and
    adjusting the rank for each talkgroup-specific keyword in the list of talkgroup-specific keywords based on the context data and the second context data.

11. The system of claim 8, wherein the audio data includes one selected from a group consisting of a voice command and a search term.

12. A system for optimizing voice recognition and information searching, comprising:
    a plurality of communications devices forming a talkgroup; and
    a call controller communicating with the plurality of communications devices forming the talkgroup and including an electronic processor, the electronic processor configured to:
        determine context data associated with the talkgroup that includes the plurality of communications devices;
        create a list of talkgroup-specific keywords associated with the context data, the list of talkgroup-specific keywords including a first characteristic for each talkgroup-specific keyword;
        receive, from a first communications device of the plurality of communications devices, audio data associated with a user of the first communications device;
        process the audio data to generate an initial output term;
        determine a second characteristic of the initial output term, wherein determining the second characteristic of the initial output term includes determining a second list of keywords ranked by probability based on natural language processing of the audio data;
        determine whether the list of talkgroup-specific keywords includes at least one keyword from the second list of keywords; and
        output the at least one keyword from the second list of keywords when the list of talkgroup-specific keywords includes the at least one keyword from the second list of keywords.

13. The system of claim 12, wherein the context data associated with the talkgroup includes at least one selected from a group consisting of prior voice communication in the talkgroup, prior status updates from a computer-aided dispatcher, presence of equipment in a personal area network of a talkgroup participant, data from sensors of a talkgroup participant, and one or more locations of the plurality of communications devices.

14. The system of claim 12, wherein the audio data includes one selected from a group consisting of a voice command and a search term.

\* \* \* \* \*